United States Patent [19]

Haartsen

[11] Patent Number: 5,953,323
[45] Date of Patent: Sep. 14, 1999

[54] METHOD AND APPARATUS FOR ADAPTING NON-CELLULAR PRIVATE RADIO SYSTEMS TO BE COMPATIBLE WITH CELLULAR MOBILE PHONES

[75] Inventor: Jacobus Cornelis Haartsen, Staffanftorp, Sweden

[73] Assignee: Telefonaktiebolaget L M Ericsson (publ), Stockholm, Sweden

[21] Appl. No.: 08/704,901

[22] Filed: Aug. 30, 1996

[51] Int. Cl.⁶ ...................................................... H04Q 7/30
[52] U.S. Cl. ........................... 370/330; 455/426; 370/466
[58] Field of Search ................................ 370/338, 330, 370/400, 328, 401, 402, 403, 404, 405, 406, 407, 408, 464, 465, 466, 467, 468, 522, 329, 336, 346; 455/426

[56] References Cited

U.S. PATENT DOCUMENTS

| | | | |
|---|---|---|---|
| H1641 | 4/1997 | Sharman | 370/338 |
| 5,109,528 | 4/1992 | Uddenfeldt . | |
| 5,428,668 | 6/1995 | Dent et al. . | |
| 5,448,619 | 9/1995 | Evans et al. | 455/426 |
| 5,504,803 | 4/1996 | Yamada et al. | 455/426 |
| 5,535,259 | 7/1996 | Dent et al. . | |
| 5,572,528 | 11/1996 | Shuen | 370/338 |
| 5,594,782 | 1/1997 | Zicker et al. | 455/426 |
| 5,673,308 | 9/1997 | Akhavan | 455/426 |
| 5,675,629 | 10/1997 | Raffel et al. | 455/426 |

FOREIGN PATENT DOCUMENTS

| | | |
|---|---|---|
| 43 07 966 A 1 | 3/1993 | Germany . |
| WO 95/23488 | 8/1995 | WIPO . |

*Primary Examiner*—Huy D. Vu
*Attorney, Agent, or Firm*—Jenkens & Gilchrist, P.C.

[57] ABSTRACT

The air interface of a private radio system is adapted to be compatible with the air interface of a cellular mobile network. The private radio system's beacon channel includes a dual-burst type of frequency correction channel and synchronization channel. The burst formats of these two channels are defined according to the frequency correction channel and synchronization channel burst formats used in the cellular mobile network. An information message carried in the private synchronization channel includes status and identity information related to the private radio system. An access request channel is defined for the private radio system, which enables a mobile terminal to request access to the private radio system. The protocol of the private radio system's access request channel (in the uplink) is similar to the protocol of the cellular network's access grant channel used in the downlink. Alternatively, the protocol of the cellular network's synchronization channel in the downlink can be used for the private radio system's access request channel (in the uplink). Consequently, the mobile terminal can be used as a private cordless phone.

21 Claims, 4 Drawing Sheets

FIG.1
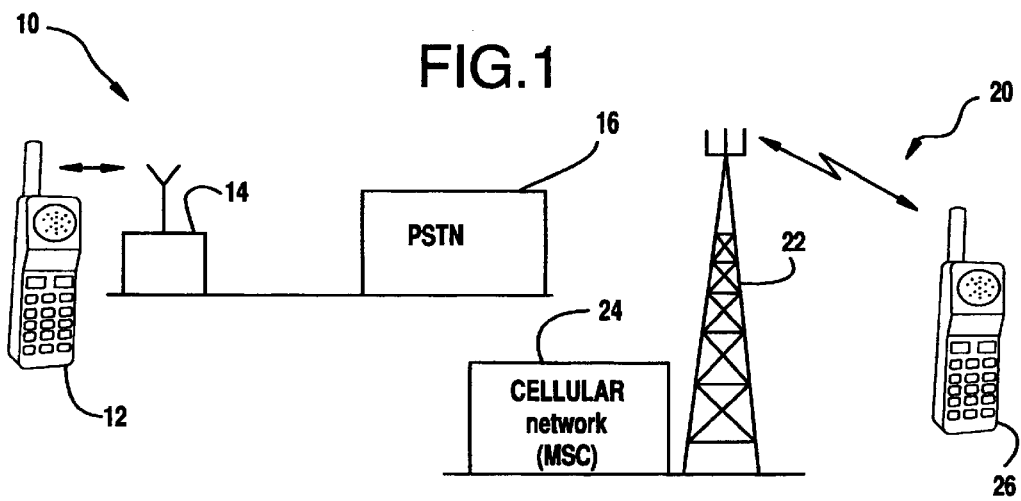
FIG.2
51 frames
FIG.3
FIG.4

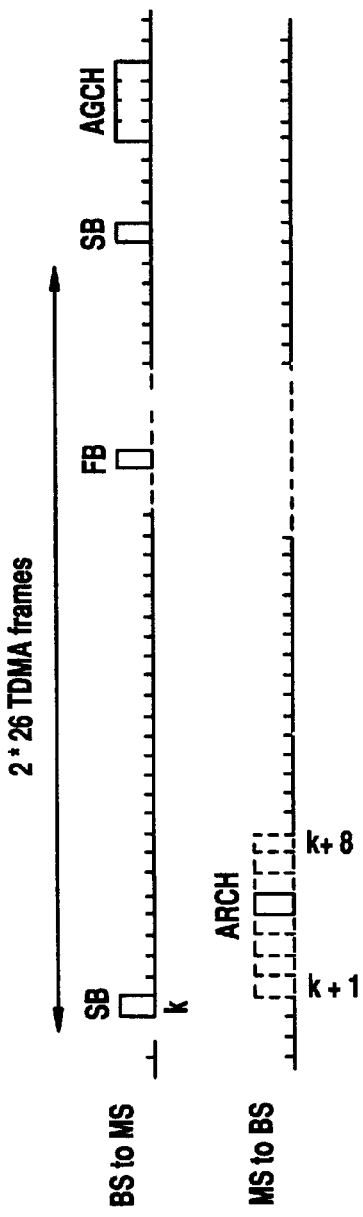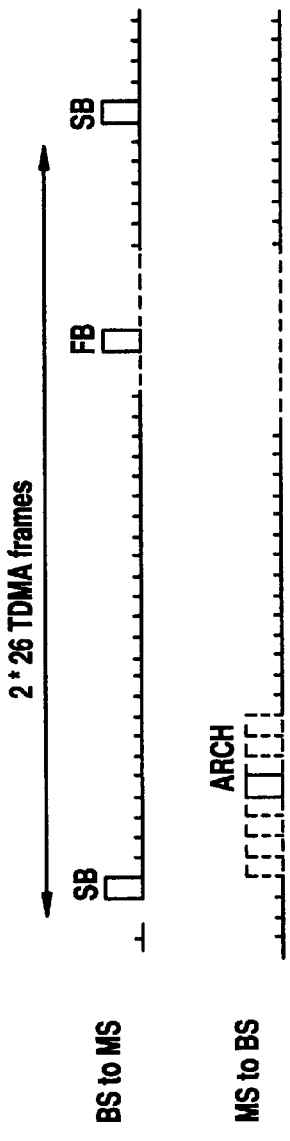

1

METHOD AND APPARATUS FOR ADAPTING NON-CELLULAR PRIVATE RADIO SYSTEMS TO BE COMPATIBLE WITH CELLULAR MOBILE PHONES

BACKGROUND OF THE INVENTION

1. Technical Field of the Invention

The present invention relates generally to the wireless telecommunications field and, in particular, to a private radio communications system that is compatible for use with cellular mobile telephones.

2. Description of Related Art

The commercial utilization of digital mobile communications systems for public telephony has grown tremendously during the past decade. For example, since the mid-1980's, a large number of digital cellular communications systems have been fielded for public use throughout the world, such as the Global System for Mobile Communications (GSM) in Europe, the Personal Digital Cellular (PDC) System in Japan, and the Digital Advanced Mobile Phone System (DAMPS) in North America. However, although many of the technical specifications for these systems are different, the GSM air interface standard, which was created in Europe, is being used in many of the other cellular systems deployed throughout the world.

The GSM air interface standard, which is so widely in use, is based on a Time Division Multiple Access (TDMA) scheme of channel allocation. This TDMA allocation scheme allows the use of a hierarchical cell communications structure, in which so-called macrocells cover large regional areas or districts, microcells cover somewhat smaller areas (e.g., a stretch of highway), and picocells cover even smaller areas (e.g., the size of one or two rooms). However, an important requirement of existing systems using such a hierarchical cell structure is that the base stations deployed, which define the cell coverage areas, must all belong to the same cellular network (e.g., Public Land Mobile Network or PLMN).

In business and residential environments, users of telephony services have limited mobility and, therefore, can be offered services not normally available to the highly mobile users of cellular networks. For example, U.S. Pat. Nos. 5,428,668 and 5,535,259 disclose a private radio base station, which is not an integral part of a disclosed cellular network, but is connected directly to a Public Switched Telephone Network (PSTN). When a mobile cellular terminal comes within radio range of a "home base station" (HBS) of the private system, the mobile terminal is converted operationally to a cordless phone. Using this cordless mode of operation, a mobile user can realize numerous advantages over the cellular mode, such as the lower PSTN rates incurred, higher quality voice communications, and a substantially longer standby time.

Many similar and other advantages would be realized if a private radio system were to have an air interface that is compatible with a cellular network air interface. For example, a mobile terminal could be converted into a dual-mode cellular-HBS portable terminal, by downloading software from the mobile network or private system to implement the cordless mode of operation. Additionally, the private radio system's existing base station hardware could be used in such a dual-mode cellular-HBS operation, provided the base station's transmit and receive frequencies are exchanged. Nevertheless, these private radio systems are not operationally compatible with existing cellular networks, and the above-described advantages are not being realized.

SUMMARY OF THE INVENTION

It is an object of the present invention to enable a cellular mobile phone user to access a private radio system and communicate in a cordless mode.

It is also an object of the present invention to adapt the air interface of a private radio system to be compatible with the air interface of a cellular mobile network.

It is yet another object of the present invention to enable a cellular mobile phone user to access a private radio system and communicate via a fixed telephone network.

In accordance with one aspect of the present invention, the foregoing and other objects are achieved by a method and apparatus for adapting the air interface of a private radio system to be compatible with the air interface of a cellular mobile phone network.

In accordance with another aspect of the present invention, the foregoing and other objects are achieved by a method and apparatus for adapting the beacon channel of a private radio system to enable a cellular mobile phone to operate in a cordless mode.

BRIEF DESCRIPTION OF THE DRAWINGS

A more complete understanding of the method and apparatus of the present invention may be had by reference to the following detailed description when taken in conjunction with the accompanying drawings wherein:

FIG. 1 is a top level schematic block diagram that illustrates a method and apparatus for use in adapting a private radio system to be compatible with a cellular communications system, in accordance with a preferred embodiment of the present invention;

FIG. 2 is a diagram that illustrates a conventional control channel frame format;

FIG. 3 is a diagram that illustrates a burst format used in a frequency correction channel frame of the conventional control channel frame format shown in FIG. 2;

FIG. 4 is a diagram that illustrates a burst format used in a synchronization control channel frame of the conventional control channel frame format shown in FIG. 2;

FIG. 11 is a diagram that illustrates an uplink and a downlink beacon control channel frame sequence that can be used for granting or requesting access to a private radio channel, in accordance with the second embodiment of the present invention;

FIG. 12 is a diagram that illustrates a method of using an ARCH SB in a registration update, in accordance with the second embodiment of the invention.

DETAILED DESCRIPTION OF THE DRAWINGS

Figure 5:
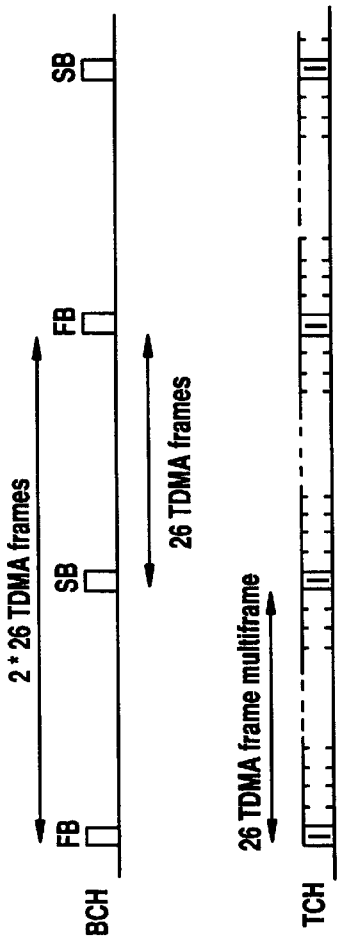
FIG. 5 is a diagram that illustrates a beacon channel frame format that can be used to adapt a private radio system to be compatible with a mobile communications network, in accordance with the preferred embodiment of the present invention.

The preferred embodiment of the present invention and its advantages are best understood by referring to FIGS. 1–12 of the drawings, like numerals being used for like and corresponding parts of the various drawings.

FIG. 1 is a top level schematic block diagram that illustrates a method and apparatus for use in adapting a private radio system to be compatible with a cellular communications system, in accordance with a preferred embodiment of the present invention. A private radio system includes a base station (e.g., an HBS) 14 with a low power transmitter/receiver. In this embodiment, base station 14 is linked for two-way communications with a dual-mode private radio-mobile cellular terminal 12 via an air interface. Base station 14 is also connected for two-way communications with a PSTN 16. As described in detail below, the private radio system's air interface is compatible with the air interface of a cellular mobile communications system 20. An example of a mobile terminal that can be used for terminal 12 is a standard cellular phone as utilized, for example, in the GSM.

Cellular system 20 includes a base station 22 connected to a mobile services switching center 24. Base station 22 includes a transmitter/receiver, which defines the coverage area of at least one cell in cellular system 20. Base station 22 is linked for two-way communications with a mobile cellular phone 26 via a second air interface. In this embodiment, phone 26 can be a second dual-mode private radio-mobile cellular phone. Notably, although only one private radio base station and cellular base station are shown in FIG. 1, it is for illustrative purposes only and the invention is not intended to be so limited. In that regard, it should be understood that a plurality of similar private radio base stations or cellular base stations could be shown that would still be within the scope of the present invention.

Generally, in accordance with the preferred embodiment, the air interface of a private radio system is adapted to be compatible with the air interface of a cellular mobile network. In the illustrative embodiment shown in FIG. 1, the GSM air interface is used as a model protocol, because it is so widely accepted and used throughout the world. However, the present invention is not intended to be limited to just the GSM protocol, and any appropriate mobile network air interface can be used, as long as a private radio system air interface can be adapted for compatibility with the mobile network's air interface without undue technical difficulty.

Specifically, in the preferred embodiment, the broadcast control channel of a private radio base station is adapted to be compatible with the air interface protocol used for GSM. The broadcast channel of such a private radio base station can be simplified considerably with respect to the GSM control channel, since the private radio base station serves a limited number of mobile terminals in a restricted area. Instead of continuously broadcasting information, a low duty-cycle beacon signal is used. The beacon channel (BCH) includes a frequency correction burst (FB) in the frequency correction channel (FCCH), and a synchronization burst (SB) in the synchronization channel (SCH). These burst formats are defined according to the FB and SB formats used in the GSM. However, the information message carried in the private radio base station's BCH SB includes status and identity information related to the private radio system.

At this point, it is useful to describe certain mobile network control channel operations. FIG. 2 is a diagram that illustrates a conventional GSM control channel frame format. At power up, a GSM mobile terminal scans certain prescribed frequency bands for the GSM FB. The FB is transmitted from a GSM base station in a control channel that has the format shown in FIG. 2. FIG. 2 shows that there is one 51 TDMA frame multiframe in the GSM. The GSM multiframe includes an FCCH (when the mobile terminal synchronizes its frequency), an SCH (when the mobile terminal synchronizes its timings, and reads the TDMA frame number and Base Station Identity Code), Broadcast Control Channel or BCCH frames (when the mobile terminal reads general information about the cell defined by the control channel), Common Control Channel or CCCH frames (when the mobile terminal can be paged or allocated a Stand alone Dedicated Control Channel or SDCCH), and an Idle frame (when dummy bits are transmitted).

FIG. 3 is a diagram that illustrates a burst format used in a conventional GSM FB. The GSM FB includes 6 tail bits (TB) and 142 fixed bits (zeroes). In the GSM, the 142 zeroes in the FB causes the modulator in the base station transmitter to generate an unmodulated carrier.

Once the mobile terminal has found the GSM FB, the terminal searches for the GSM SB, which includes network and base station identity information, and time reference information. FIG. 4 is a diagram that illustrates a burst format used in a conventional GSM SB. The GSM SB includes a 64 bit training sequence, which is a known bit pattern used for a timing reference, and also used by a channel equalizer to estimate a channel model. The GSM SB also includes 6 tail bits (zeroes), which helps the GSM convolutional decoder by providing a predetermined starting and stopping point for a convolutional coding algorithm. Additionally, the GSM SB includes 78 encrypted bits that encode a 25-bit data or speech information message. The 78 encrypted bits also includes 6 bits that reveal the network identity and base station color code, and 19 bits that indicate the TDMA frame number for the GSM base station being contacted.

Once the mobile terminal has been granted access to the network (e.g., GSM), the terminal reads the BCCH frame to obtain pertinent information about the cell in which it resides. The network registers the mobile terminal by updating the terminal's location, and the mobile terminal is returned to an idle mode. The mobile terminal remains in the idle mode, except for being periodically activated to receive the network's paging channel (PCH) via the CCCH.

As described above, the GSM control channel generally provides four basic functions, such as: (1) locking the mobile terminal to the appropriate channel frequency; (2) identifying the network and base station; (3) synchronizing the mobile terminal in time; and (4) controlling the mobile terminal's access to the network. As such, these basic GSM control functions are considered in adapting a private radio system to be compatible for use with the GSM. Consequently, in accordance with the present invention, the private radio system uses the network (GSM) burst formats for compatibility purposes, especially at the lower physical layers.

FIG. 5 is a diagram that illustrates a beacon channel frame format that can be used to adapt a private radio system to be compatible with a mobile communications network, in accordance with the preferred embodiment of the present invention. Essentially, in this embodiment, a novel control channel is used for the private radio system, which includes an FB/SB pair that is transmitted at a low duty cycle. As illustrated by FIG. 5, the FB/SB pair of this control channel is transmitted every N 26-frame sequences, where N is an integer. In this illustrative example, N is equal to 2. Preferably, this FB/SB pair occurs in the idle frame of a 26-frame sequence used for a traffic connection (e.g., traffic channel or TCH). The value of N is selected preferably to be small, in order to decrease network access delay time, and reduce the scan time needed for a mobile terminal to find a network beacon signal when it is not connected to a private radio system base station.

Similar to the GSM broadcast control channel, the number of TDMA time slots transmitted between each FB and SB in the pair is a fixed number, M, so that when a terminal finds the FB, it can then find the SB relatively quickly. However, the number M is preferably not such that the FB/SB beacon pair lines up with the FB/SB occurrence in the GSM broadcast control channel as shown in FIG. 2, in order to keep any GSM mobile terminal that is located nearby the private radio base station from arbitrarily locking on to the private radio system control channel when the terminal is first turned on. In the preferred embodiment, the distance between the FB and SB of the beacon channel is 26 TDMA frames. In this case, the beacon burst transmission lines up with the idle frames of a traffic connection (see FIG. 5). This means that the private radio base station can still transmit the full beacon channel, even when it has a connection in progress. As a consequence, all mobile terminals registered with the private base station, but not participating in the traffic connection, can still remain locked to the private radio beacon.

In operation, the private radio system base station (e.g., base station 14 in FIG. 1) transmits the preferred FB/SB pair, which allows an authorized (e.g., subscriber) mobile terminal that is scanning for a private base station, to lock on and synchronize with the nearby private base station. The mobile station then has to determine if that private radio base station is authorized for use. Consequently, the identity (and operational status) of the private base station (14) is provided in the SB of the BCH.

Figure 6:
FIG. 6 is a diagram that illustrates the bit contents of a synchronization channel burst in a private radio beacon channel, in accordance with the first embodiment of the present invention.

For example, FIG. 6 is a diagram that illustrates the bit contents of the SB in the private radio BCH, in accordance with the first embodiment of the present invention. The SB includes 25 bits that can be used to identify the private radio base station. K bits of the 25 bits can be used for base station and network identification information, and the remaining (25 minus K) bits can be used for status information (as described in detail below). K is 22 bits in the preferred embodiment, but any number of bits less than 25 may be used for K. The K-bit private base station identity segment of the SB is hereinafter referred to as the Home Base Beacon Identity (HBBI). The HBBI is composed of two parts: a K1-bit network color code (NCC); and a K2-bit base color code (BCC). A BCC is used preferably when a plurality of private base stations are combined to form a network identified by the NCC, and handover between the private base stations is desired. K1 and K2 are 14 and 8 bits, respectively, in the preferred embodiment. The mobile terminal detects and uses the HBBI to determine (with high probability) whether the private base station is authorized for use, by comparing the private base station information in the HBBI with a private base station list stored in a nonvolatile memory in the terminal. If so, the mobile terminal can register with that private base station. Preferably, a more intensive authentication procedure is followed which determines whether or not the mobile terminal is authorized to remain in contact with the private base station. In addition, the private base station may be authenticated by the mobile terminal, in order to verify that it is the private base station it claims to be and is permitted to accept the considered mobile terminal. If the authentication is successful, the mobile terminal is registered with the private radio system and can thereby begin to operate in a "cordless" mode.

In a different aspect of the present invention, prior to fully connecting with the private base station, the mobile terminal can detect the private radio base station's wireline (PSTN) number from the HBBI and report that number to the cellular network (20). Alternatively, the wireline number can be obtained while the terminal is registering with the private system. Consequently, the cellular network can use the wireline number to call-forward incoming calls to the mobile terminal's number and reroute them to the private base station's PSTN number.

The remaining (25 minus K) bits in the BCH (e.g., 3) can be used to indicate the status of the private base station. Using 3 bits, eight such states may be defined. In the preferred embodiment, four such states are defined, including an IDLE, BUSY, PAGE, and REGISTRATION UPDATE state. An IDLE state can indicate that the private base station has a radio resource (e.g., channel) available to communicate with a new mobile terminal. A BUSY state can indicate that all radio resources are occupied and it is not possible for the private base station to communicate with an additional mobile terminal. For example, if a base station is simply configured so that it can handle only one mobile terminal at a time, a BUSY state is set in the status field of the BCH, as soon as one channel is processed. In a more complex private base station configuration, where a plurality of channels can be processed simultaneously, a BUSY state is set in the BCH when all of the channels are occupied. In other words, the presence of a BUSY "flag" in the BCH means that, at that moment, the mobile terminal cannot access the private base station.

If the private base station is transmitting a BUSY state in the BCH, the mobile terminal attempting to register can attempt to lock to the private base station based on the information found in the HBBI, but the terminal has to wait for authentication and registration until the private base station enters an IDLE mode (e.g., sets IDLE flag in the BCH). Alternatively, the mobile terminal user can elect to remain in the cellular mode of operation, and attempt to register with the private base station at a later point in time. On the other hand, if the BUSY state is set, and the mobile terminal is registered with the private base station, the terminal can remain locked to the private base station, but the terminal is not allowed to set up a call. However, the user has the option of switching the terminal to the cellular mode of operation when a call cannot be set up through the private base station.

If the PAGE flag is set in the BCH, the private base station can page a specified mobile terminal, or all registered terminals. In the preferred embodiment, for paging, the K1-bit NCC in the HBBI is replaced by a K1-bit TEMPORARY PAGE NUMBER (TPN), which is assigned to the mobile terminal during registration with the private system. Upon detecting the PAGE status flag, a registered terminal that has not been paged can remain locked to the base station channel, provided that the terminal can decode the BCC.

However, an unpaged terminal may not initiate an attempt to access the private system. In the set of $2^{K1}$ PAGE numbers available, a default PAGE number is provided to which all registered terminals can respond.

A REGISTRATION UPDATE state set in the BCH is similar to a PAGE state, in that a specific terminal can be paged. However, instead of the mobile terminal initiating call set up by transmitting a CHANNEL REQUEST message (described below), the terminal transmits its identity information. This procedure assures the private radio system that the mobile terminal is still locked to the private base station. Otherwise, the terminal is implicitly deregistered (if it loses the lock) by the radio system, since the terminal is unable to deregister itself once it has lost lock (e.g., moved out of range).

A TDMA frame number is provided in a GSM control channel, because there is a high number of terminals simultaneously in contact with the mobile network. However, it is not necessary to broadcast a TDMA frame number in private radio systems, because only a relatively low number of mobile terminals are in contact with a private radio system at any one point in time. In the private system, a frame numbering can be used which is randomly initialized at installation. During registration, the current TDMA frame number of the private radio system can be transferred to the mobile terminal, and subsequently incremented synchronously at both the base station and terminal. However, for a handover from one base station to another base station in the same private system (e.g., business applications), broadcasting a TDMA frame number could be useful in facilitating a seamless handover of the encryption information. Under those circumstances, an alternate handover technique can be used, such as the technique described in commonly-assigned, copending U.S. patent application Ser. No. (docket no. EUS00507).

A new Access Request Channel (ARCH) is defined for the private radio system. This ARCH can be different from the Random Access Channel (RACH) used in conventional cellular systems, which allow for timing misalignment due to propagation delay. Because of the relatively short range of the private radio systems, propagation delay can be ignored and a more powerful ARCH can be defined. Two illustrative embodiments for such a private radio system ARCH are described below. In the first such embodiment, the protocol of the private radio system's ARCH (in the uplink) is similar to the protocol of the GSM Access Grant Channel (AGCH) used in the downlink. Because of the relatively short range involved, the uplink transmission can be directly synchronized with the downlink transmission, thereby allowing for a normal burst format.

Figure 7:
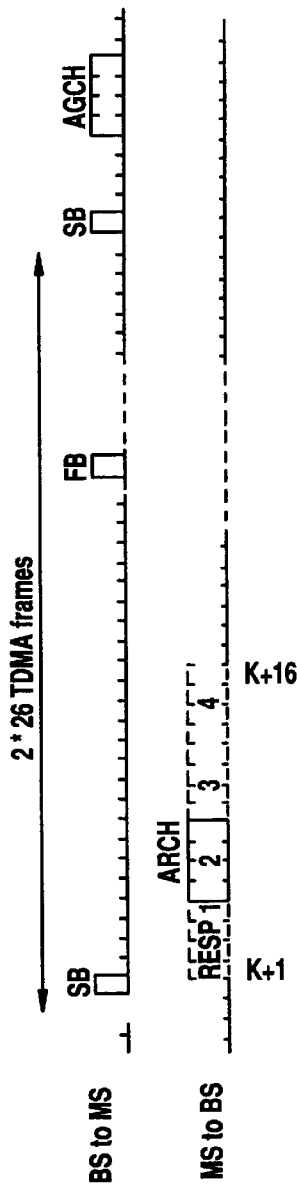
FIG. 7 is a diagram that illustrates an uplink and a downlink beacon control channel frame sequence that can be used for granting or requesting access to a private radio channel, in accordance with the first embodiment of the present invention.

FIG. 7 is a diagram that illustrates an uplink and a downlink frame sequence that can be used for granting or requesting access to a private radio channel, in accordance with the first embodiment of the invention. A mobile terminal (12) registered with a private base station (14) periodically "awakens" (preferably at a low duty cycle) to receive and decode the beacon SB transmitted by the private base station, in order to determine the private base station's status. For a mobile-originated call, the terminal waits until a beacon is received. If the IDLE flag is set in the beacon SB (e.g., the base station's status is IDLE), the mobile terminal issues a CHANNEL REQUEST message in the access request channel (ARCH). Such an ARCH is shown in the lower frame sequence (downlink) of FIG. 7. In the first embodiment, the ARCH used for the private system has a channel format that is virtually identical to the GSM control channels BCCH, PCH, AGCH, or Slow Associated Control Channel (SACCH). The private base station's ARCH is distributed over four blocks of frames and transmitted in four consecutive bursts. The mobile terminal can transmit an ACCESS REQUEST message in an ARCH during four consecutive terminal-response cycles subsequent to an SB.

In other words, if it is assumed that an SB is received in frame k, the mobile terminal can transmit an ARCH during frames k+1 to k+4, k+5 to k+8, k+9 to k+12, or k+13 to k+16. Preferably, the ARCH is transmitted during the same time slot as the preceding SB. However, the specific block of frames (out of the four possible blocks) during which the ARCH is transmitted can be randomly selected. The ACCESS REQUEST message in the ARCH contains general information about the requesting mobile terminal, such as, for example, the establishment cause (e.g., answer to page, channel request, or answer to registration update), its temporary page number or a random access number, and (if desired) time synchronization information. The ARCH message is repeated at the same position (randomly determined at the first ARCH occurrence) with respect to the BCH SB until the AGCH message arrives, or the REGISTRATION UPDATE indication in the BCH SB disappears.

Upon receiving the ARCH from the mobile terminal, the private base station waits until the next beacon occurs, and returns an ACCESS GRANT message in an access grant channel (AGCH). An example of such an AGCH is shown in the upper frame sequence (uplink) of FIG. 7. In this embodiment, the format of the AGCH shown in FIG. 7 is virtually identical to the format specified for the GSM AGCH. The private base station's AGCH is preferably located at the same frame position with respect to the BCH SB as the frame position of the ARCH. The ACCESS GRANT message preferably includes the same TPN or random access number that was in the ACCESS REQUEST message, and control information that immediately assigns the requesting mobile to a traffic channel, such as the channel's carrier frequency and the time slot position allocated to the terminal. On the other hand, for a mobile-terminated call, the transmitted BCH SB contains a PAGE status flag, and the same process described directly above for the mobile-originated call can be used.

In commonly-assigned, co-pending U.S. patent application Ser. No. (docket no. EUS00509), a method has been described for synchronizing a private base station with a GSM broadcast control channel using a mobile terminal as an intermediary. As described, the terminal is synchronized with the broadcast control channel of the GSM base station, and transmits its uplink information to the private base station based on the GSM time reference. In turn, the private base station is synchronized with the signal received from the terminal. However, the above-described method may be employed only if the GSM network overlays the private network. In that regard, since a terminal would not likely be synchronized with the GSM network at the time a call is set up with a private base station, such synchronization with the GSM would be required.

Figure 8:
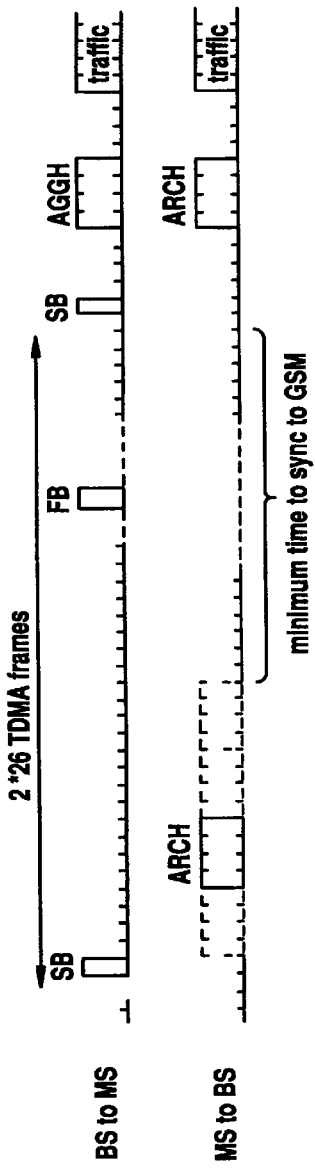
FIG. 8 is a diagram that illustrates an uplink and a downlink beacon control channel frame sequence that can be used for granting or requesting access to a private radio channel and synchronizing with a cellular base station, in accordance with the first embodiment of the present invention.

FIG. 8 is a diagram that illustrates an uplink and a downlink BCH frame sequence that can be used for granting or requesting access to a private radio channel and synchronizing with a GSM base station, in accordance with the first embodiment. Subsequent to the call setup process, the mobile terminal (12) transfers a coarse timing alignment message to the private base station (14), in order to obtain time slot synchronization between the private base station's transmissions and the GSM base station's (22) transmissions. The terminal becomes synchronized directly after it transmits an ACCESS REQUEST message, and preferably prior to receiving the next beacon. In this embodiment, since the latest block of the ARCH can occur at frame k+16 (assuming that the SB was received at frame k), there are (26*N)−17 frames available for use in synchronizing the terminal to the GSM control channel.

For example, if N is equal to 2, there are 35 TDMA frames available for use in synchronizing the terminal to the GSM control channel. Referring back to FIG. 2, at least three FB/SB sequences on the cellular broadcast channel can occur in 35 TDMA frames. In the first of such sequences, only the FB information is used to achieve coarse time (and possibly frequency) synchronization. Consequently, the second such sequence can be used to obtain fine time (and frequency) synchronization, by having the terminal decode and use information in the SB. However, if the second sequence is preceded by an IDLE frame, the terminal will be unable to find the SB. In that case, a third such FB/SB sequence is used. Once the terminal finds the FB in the first sequence, it searches every subsequent eleventh frame for an SB, which is transmitted in either the second or third FB/SB sequence. In the worst case situation, the terminal would have to wait 32 frames. Consequently, the value selected for N should be at least 2.

Referring again to FIG. 8, if the mobile terminal turns to the GSM network for synchronization, the terminal can communicate this attempt to the private base station in the first ACCESS REQUEST message in the ARCH. Subsequently, after the second beacon has been received (and synchronization with the GSM network has been established), the mobile terminal can transmit a second message in an ARCH, which contains appropriate time alignment information. Preferably, this second ARCH (and message) occurs in the same response frame position as the first ARCH occurred.

Notably, as shown in FIG. 8, the second ARCH message (and time alignment information) occurs at the same time the ACCESS GRANT message in the AGCH from the private base station occurs. The private base station and the mobile terminal then switch over to a new traffic channel (using information provided in the AGCH message) and using the new time alignment information provided in the second ARCH message. This switch-over to the new traffic channel is accomplished after a specified delay (e.g., four TDMA frames), which allows sufficient time for the private base station and terminal to decode the respective ARCH and AGCH messages received. If the connection is not re-established on the new traffic channel after the specified delay, the private base station repeats the AGCH message, using the same position with respect to the BCH SB as before. The message is repeated until the mobile terminal is found on the new channel, or until a predetermined timeout period has expired.

In the event that this synchronization is not established before a second beacon is transmitted, the second ARCH message transmitted is virtually identical to the message in the first ARCH, except the second ARCH message includes information that the terminal is still attempting to synchronize with the GSM system. As long as the private base station continues to receive this type of ARCH message, the private base station will not switch to the traffic channel, and responds by repeating the AGCH message until the terminal acknowledges that it is synchronized with the GSM base station (by dropping the "attempting to synchronize" information in the ARCH message). If, however, the mobile terminal is unable to synchronize with any appropriate GSM base station, then the terminal so notifies the private base station with appropriate information included in an ARCH message. In that event, the terminal and private base station can be allowed to switch over to the new traffic channel after a specified delay. Once the mobile terminal and private base station have switched over to the traffic channel, the remainder of the call setup process is completed.

Figure 9:
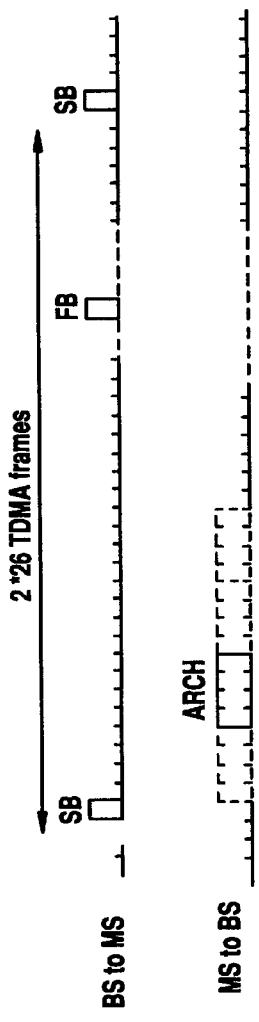
FIG. 9 is a diagram that illustrates an uplink and a downlink beacon control channel frame sequence that can be used for implementing a registration update, in accordance with the first embodiment of the present invention.

FIG. 9 is a diagram that illustrates an uplink and a downlink BCH frame sequence that can be used for implementing a registration update, in accordance with the first embodiment. A private base station (14) transmits a BCH including a REGISTRATION UPDATE status flag followed by the PAGE number of the corresponding mobile terminal. The terminal responds by transmitting a REGISTRATION ACKNOWLEDGMENT message in the ARCH, which is preferably positioned at random in one of the four terminal-response frame sequence locations subsequent to the SB. The message from the terminal includes its identity information. Subsequently, the terminal re-enters the "sleep" mode, and "wakes up" temporarily when the next beacon occurs.

Figure 10:
FIG. 10 is a diagram that illustrates the bit contents of an access request channel in a private radio system, in accordance with the second embodiment of the present invention.

In the second illustrative embodiment, the ARCH comprises merely an SB. The SB contains a long training sequence that can be used by the receiver (e.g., the private radio base station receiver in this case) to synchronize its frequency (and possibly timing). This can be beneficial if the mobile terminal's frequency reference is used as the primary reference source, as described earlier. The 25 bits in the ARCH SB are preferably coded as shown in FIG. 10. As shown, three CAUSE bits indicate the establishment cause (e.g., like channel request, acknowledge registration update, answer to page, etc.). A 14 bit field contains the TPN, which is the temporary identity a mobile terminal receives when registering at a private radio base station. The last 8 bits can contain control information, such as, for example, time synchronization information (time difference or TD), in order to align the private base station's timing.

The method of using the ARCH in the second embodiment is similar to the method used for the first embodiment. FIG. 11 is a diagram that illustrates an uplink and a downlink frame sequence that can be used for granting or requesting access to a private radio channel, in accordance with the second embodiment of the present invention. The mobile terminal can transmit an ACCESS REQUEST message in the ARCH SB, in any of the eight consecutive TDMA frames subsequent to the BCH SB. In other words, assuming that an BCH SB is received in frame k, the mobile terminal can transmit an ARCH during frames k+1 to k+8. The ARCH SB position is randomly selected by the mobile terminal. FIG. 12 is a diagram that illustrates a method of using such an ARCH SB in a registration update, in accordance with the second embodiment of the invention.

In the event that a plurality of private base stations are combined to form a private network (e.g., business or office application), the above-described beacon channel concept for use with a single private base station can also be used for the private network. For example, the BCH for each of the different base stations in the private network is transmitted in a unique carrier frequency. Also, each of the base stations in the private network preferably transmits a unique HBBI. Each such HBBI is defined so that the NCC information included is the same for all of the base stations in the private network, but the BCC information included is uniquely related to that individual base station. Consequently, with a K2-bit BCC, $2^{K2}$ unique base stations can be distinguished within the private network.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for enabling a private radio system to be compatible with a mobile terminal used in a mobile network, said method comprising the steps of:

adapting an air interface of the private radio system to be compatible with an air interface of the mobile network, said step of adapting including:

generating within the private radio system a first control channel including a frequency correction channel incorporating frequency control information and a synchronization channel incorporating timing control information; and configuring said frequency control information and said timing control information in accordance with a format defined by a protocol of the air interface associated with the mobile network;

transmitting the first control channel from a base station of the private radio system to the mobile terminal;

determining, in response to receiving the transmitted first control channel, if the base station is authorized for use by the mobile terminal; and enabling the mobile terminal to operate in a cordless mode with said base station, if so authorized.

2. The method of claim 1, wherein said step of determining if the base station is authorized further including the steps of:

transmitting within the synchronization channel an identity of the base station to the mobile terminal; and comparing the transmitted identity to at least one stored identity within the mobile terminal, where the base station is authorized when there is a match between the transmitted identity and the at least one stored identity.

3. The method of claim 1, wherein said step of enabling further including registering the mobile terminal with the base station.

4. The method of claim 3, further comprising the step of requesting access to a private radio channel of the base station.

5. The method of claim 4, further comprising the step of granting access to the private radio channel depending on a status of the base station.

6. The method of claim 3, further comprising the step of synchronizing the base station, the mobile terminal, and the mobile network.

7. The method of claim 1, further comprising the step of timing the transmission of the frequency correction channel and the synchronization channel of the private radio system to be at different intervals than the timing of the transmission of a frequency correction channel and a synchronization channel of the mobile network.

8. The method of claim 1, further comprising the step of timing a selected one of the frequency correction channel and the synchronization channel to be transmitted when an idle frame occurs in a traffic channel of the private radio system.

9. The method of claim 1, further comprising the steps of:

transmitting within the synchronization channel a wireline number associated with the base station to the mobile terminal;

forwarding the received wireline number to the mobile network; and rerouting, in response to receiving the forwarded wireline number, at least one incoming call directed to the mobile terminal from the mobile network to the base station.

10. The method of claim 1, further comprising the step of indicating within the synchronization channel a status of the base station.

11. The method of claim 10, wherein said step of indicating a status further includes classifying the status as a selected one of an idle state, a busy state, a page state and a registration update state.

12. A system for enabling a user within a mobile network to communication with a private radio system, said system comprising:

a base station, associated with said private radio system, operable to generate a beacon channel including a frequency correction channel incorporating frequency control information and a synchronization channel incorporating timing control information, said base station operable to configure and transmit said frequency control information and said timing control information in accordance with a format defined by a protocol of an air interface associated with the mobile network;

a mobile terminal, in response to receiving the transmitted beacon channel, operable to determine if the base station is authorized for use by said mobile terminal and, if so authorized, said mobile terminal is configured to operate in a cordless mode with said base station.

13. The system of claim 12, wherein said base station further including means for synchronizing the base station, the mobile terminal, and the mobile network.

14. The system of claim 12, wherein said base station further including means for timing the transmission of the frequency correction channel and the synchronization channel of the private radio system to be at different intervals than the timing of the transmission of a frequency correction channel and a synchronization channel of the mobile network.

15. The system of claim 12, wherein said base station further including means for timing a selected one of the frequency correction channel and the synchronization channel to be transmitted when an idle frame occurs in a traffic channel of the private radio system.

16. The system of claim 12, wherein said base station further including means for indicating within the synchronization channel a status of the base station.

17. A private radio system for enabling a user within a mobile network to communicate by way of a mobile terminal through said private radio system, said private radio system comprising:

a base station including means for generating a beacon channel including a frequency correction channel incorporating frequency control information and a synchronization channel incorporating timing control information;

means, coupled to said means for generating, for configuring said frequency control information and said timing control information in accordance with a format defined by a protocol of an air interface associated with the mobile network; and means, coupled to said means for configuring, for transmitting said beacon channel to said mobile terminal that determines if use of the base station has been authorized.

18. The private radio system of claim 17, wherein said base station further including means for synchronizing the base station, the mobile terminal, and the mobile network.

19. The private radio system of claim 17, wherein said base station further including means for timing the transmission of the frequency correction channel and the synchronization channel of the private radio system to be at different intervals than the timing of the transmission of a frequency correction channel and a synchronization channel of the mobile network.

20. The private radio system of claim 17, wherein said base station further including means for timing a selected one of the frequency correction channel and the synchronization channel to be transmitted when an idle frame occurs in a traffic channel of the private radio system.

21. The private radio system of claim 17, wherein said base station further including means for indicating within the synchronization channel a status of the base station.

* * * * *